United States Patent
Kong et al.

(10) Patent No.: US 7,379,113 B2
(45) Date of Patent: May 27, 2008

(54) IMAGE SENSOR MODULE HAVING AUTO-ALIGNED LENS, AND METHOD OF FABRICATING THE SAME, AND METHOD OF AUTOMATICALLY CONTROLLING FOCUS OF LENS

(75) Inventors: Yung-Cheol Kong, Chungcheongnam-do (KR); Tai-Hyun Eum, Chungcheongnam-do (KR); Ji-Sun Hong, Chungcheongnam-do (KR); Sung-Woo Park, Ulsan Metropolitan (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 355 days.

(21) Appl. No.: 11/112,819

(22) Filed: Apr. 21, 2005

(65) Prior Publication Data

US 2005/0237415 A1    Oct. 27, 2005

(30) Foreign Application Priority Data

Apr. 26, 2004  (KR)  ................... 10-2004-0028628

(51) Int. Cl.
*H04N 5/225*    (2006.01)
*G02B 7/02*    (2006.01)
*G03B 17/00*    (2006.01)

(52) U.S. Cl. ............... 348/340; 359/819; 359/822; 359/823; 396/529

(58) Field of Classification Search ............... 348/340; 359/819, 822, 823; 396/529
See application file for complete search history.

(56) References Cited

U.S. PATENT DOCUMENTS 6,483,652 B2  11/2002  Nakamura 6,898,030 B1 *  5/2005  Lin et al. ............. 359/819
2005/0237418 A1 * 10/2005  Sakamoto ............. 348/340
2005/0285016 A1 * 12/2005  Kong et al. ............. 250/208.1
2006/0044450 A1 *  3/2006  Wolterink et al. ......... 348/340

FOREIGN PATENT DOCUMENTS

KR    2000-0050478    8/2000
KR    2002-0085120    11/2002
KR    2003-0088887    11/2003

OTHER PUBLICATIONS

English language abstract of Korean Publication No. 2000-0050478.
English language abstract of Korean Publication No. 2002-0085120.
English language abstract of Korean Publication No. 2003-0088887.

* cited by examiner

*Primary Examiner*—Melissa Jan Koval
(74) *Attorney, Agent, or Firm*—Marger Johnson & McCollom, P.C.

(57) ABSTRACT

In one embodiment, an image sensor module having an auto-aligned lens includes: a substrate on which an image sensor chip is mounted; a housing which has an opening to expose an upper surface of the image sensor chip, and which is attached onto the substrate; a lens holder which extends the opening vertically and upwardly; and a lens unit incorporating spacers which is fixed to an inner sidewall of the lens holder and is aligned automatically. Friction-caused particles are not produced, and focal alignment is readily automated.

22 Claims, 6 Drawing Sheets

FIG. 9

IMAGE SENSOR MODULE HAVING AUTO-ALIGNED LENS, AND METHOD OF FABRICATING THE SAME, AND METHOD OF AUTOMATICALLY CONTROLLING FOCUS OF LENS

BACKGROUND OF THE INVENTION

This application claims the priority of Korean Patent Application No. 2004-28628 filed on Apr. 26, 2004 in the Korean Intellectual Property Office, the disclosure of which is incorporated herein in its entirety by reference.

1. Field of the Invention

The present invention relates to an image sensor module and a method of fabricating the same, and more particularly, to an image sensor module in which a focal length of a lens can be automatically aligned, and a method of fabricating the same, and a method of automatically controlling a focus of the lens.

2. Description of the Related Art

Due to the recent popularity of various mobile electronic products such as cellular phones, Portable Digital Assistants (PDA), and digital cameras, digital photography has become very important. Specifically, a palm-sized apparatus having a digital camera such as PDA and cellular phone employs a key technique for photographing and transmitting an image. Accordingly, an image sensor module for processing an external image into a digital signal is of importance.

Figure 1:
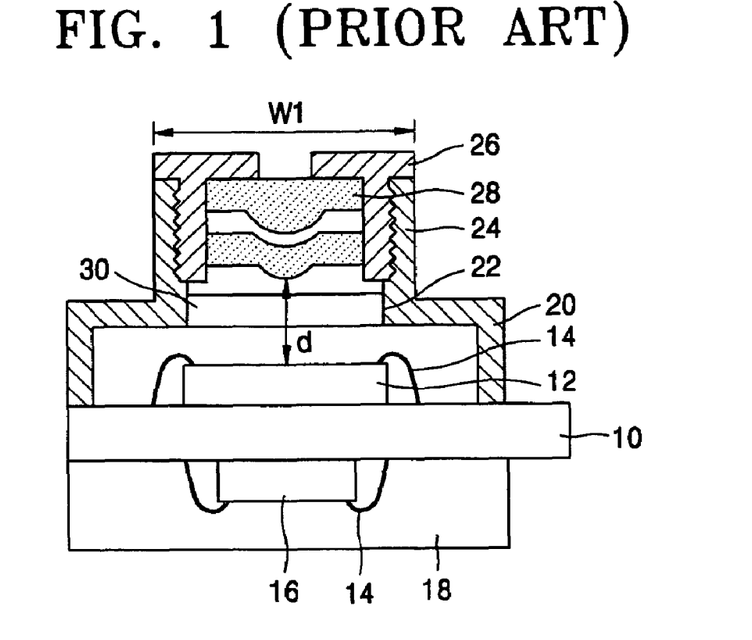
FIG. 1 is a cross-sectional view schematically illustrating a conventional image sensor module.

FIG. 1 is a cross-sectional view schematically illustrating a conventional image sensor module.

Referring to FIG. 1, an image sensor chip 12 is mounted on and electrically connected with the substrate 10 by a bonding wire 14. A digital signal processor (DSP) chip 16 can be mounted onto the other surface of the substrate 10 opposite to the image sensor chip 12. The DSP chip 16 is attached to the substrate 10 and electrically thereto to the substrate 10 through the bonding wire 14. After that, the DSP chip 16 is encapsulated by a mold 18. A housing 20 is attached onto the substrate 10 and has an opening 22 for exposing an upper surface of the image sensor chip 12. A lens holder 24 is provided on the housing 20. The lens holder 24 extends the opening 22 vertically and upwardly and has a lens assembly unit 26 affixed to an inner sidewall thereof. The lens assembly unit 26 has a plurality of lenses and is threaded into the lens holder 24.

The lens assembly unit 26 includes a toothed connection unit on an outer side surface thereof for threaded engagement with the toothed connection unit corresponding to an inner sidewall of the lens holder 24. The lens assembly unit 26 is affixed to manually control a vertical distance (d) between an upper surface of the image sensor chip 12 and the lowermost end of a lens 28. That is, the vertical distance (d) is controlled to be consistent with the focal length provided by the plurality of lenses 28. An infrared screen filter 30 can be provided between the lens 28 and the image sensor chip 12 to screen against infrared radiation.

However, a conventional method of fabricating the image sensor module including the lens assembly unit 26 has several drawbacks. First, because the vertical distance (d) is controlled in a screw manner, impurity particles are generated due to the friction between the screw threads of the lens assembly unit 26 and those of the lens holder 24 formed of a polymer material, for example, polycarbonate and polyphenylsulfide. Further, due to the manual alignment control of the lens 28, a separate process is required for manually controlling the focal length. Furthermore, since a diameter or a width (W1) of the lens holder 24 is determined including the lens assembly unit 26, it is disadvantageous when the image sensor module is to be miniaturized.

To solve the above drawbacks, U.S. Pat. No. 6,483,652 discloses an image sensor module in which a predetermined jaw is provided at an inner sidewall of the lens holder 24 without a lens assembly unit 26 to affix a lens. However, since the U.S. patent has the limitation to single-lens optics, it has a difficulty in the application of optics employing a plurality of lenses. In detail, to affix the plurality of lenses, a plurality of jaws are provided at an inner sidewall of the lens holder. However, the plurality of jaws have each a different radius to affix the plurality of lenses to the lens holder 24. Accordingly, the lenses also need to have different radiuses. Therefore, it has been very difficult to control the focal lengths of the lenses. Further, because the lens needs to be inserted into the lens holder one-by-one, the process of inserting the lens is complicated, thereby increasing the manufacturing costs. Also, it has been difficult to employ injection molding since the lens holder should be made very precisely.

SUMMARY OF THE INVENTION

Embodiments of the present invention provide an image sensor module in which a lens is automatically aligned to have a focal length consistent with a focal length of a plurality of lenses, and an image sensor chip module can be miniaturized.

Also, embodiments of the present invention provide a method of fabricating an image sensor module in which a lens is automatically aligned to have a focal length consistent with a focal length of a plurality of lenses, and an image sensor chip module can be miniaturized.

Further, embodiments of the present invention provide a method of automatically controlling a focal length of a plurality of lens.

According to an embodiment of the present invention, there is provided an image sensor module having an auto-aligned lens, the module including: a substrate for mounting an image sensor chip; a housing which has an opening for exposing an upper surface of the image sensor chip, and which is attached onto the substrate; a lens holder which extends the opening vertically and upwardly; and a lens unit having a plurality of lenses with a spacer disposed therebetween. The lens unit is affixed to an inner sidewall of the lens holder and is aligned automatically.

In one aspect, the image sensor module, the lens holder has a fixing jaw extending into a portion of the extended opening.

The lens unit can include: a plurality of spheric or aspheric lenses; and a ring-shaped spacer which is closely attached to a sidewall of the lens holder, for controlling a distance between the lenses.

The lens and the spacer can be integral-typed.

The distance between the lenses can be controlled by a variation of a thickness of the spacer.

The spacer may have a width less than or the same width as a flat portion of the lens.

The module can further have a ring-shaped screen film on an uppermost lens of the lens unit to screen light incident from the external.

The module can further have a fixing jaw, which has an upper surface parallel with an upper surface of the image sensor chip, on a lower inner sidewall of the lens holder.

The module can further include a digital image processor chip on a lower surface of the substrate.

The module can further include a digital image processor chip between the substrate and the image sensor chip.

According to another embodiment of the present invention, there is provided a method of fabricating an image sensor module having an auto-aligned lens, the method including: mounting an image sensor chip on a substrate; attaching a housing and a lens holder onto the substrate, the housing having an opening which exposes the image sensor chip, and the lens holder extending the opening vertically and upwardly; fabricating a lens unit which is installed in the lens holder and automatically aligned; and assembling the lens unit to an inner sidewall of the lens holder.

The fabricating of the lens unit includes: coating a binder resin on an upper surface of a first lens; pressing a spacer onto the first lens having the coated binder resin; coating the binder resin on an upper surface of the pressed spacer; and pressing a second lens onto the spacer having the coated binder resin.

The coating of the binder resin includes: placing a droplet of the binder resin at a predetermined area of an upper surface of the first lens or the spacer by using a fiber having a small diameter; and pressing the dropped droplet by using the spacer or the second lens to spread the placed droplet in a film type.

The binder resin can be formed of an ultraviolet-radiation curing material.

After the pressing of the second lens, the method can further include: curing the binder resin by using ultraviolet radiation; and heating the cured results for heat-treatment.

A screen film can be further provided on an uppermost lens of the lens unit.

A fixing jaw having an upper surface parallel with an upper surface of the image sensor chip can be further provided on a lower inner sidewall of the lens holder.

According to a yet another embodiment of the present invention, there is provided an automatic focus controlling method using an auto-aligned lens, the method including: preparing a reference object; storing a reference image, which is provided as an optimal image by the reference object, in a separate measurement unit; preparing a vacuum holder to which the reference object is attached; holding the lens unit by using the vacuum holder; descending the vacuum holder vertically to insert the lens unit into the lens holder; comparing a matching degree of the reference image and a comparative image, which is an image of the reference object formed by the lens unit, by using the measurement unit; stopping to descend the vacuum holder in case where the matching degree of the reference image and the comparative image is reliably satisfied; and fixing the lens unit to the lens holder by using the binder resin.

The fixing using the binder resin can further include: curing the binder resin by using ultraviolet ray; and heating the cured results for heat-treatment.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 2:
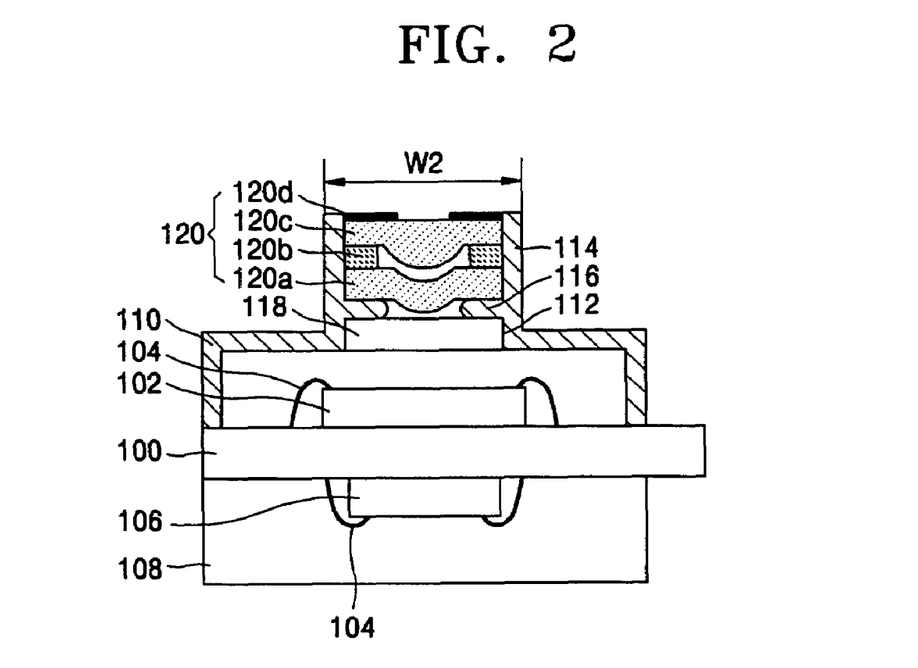
FIG. 2 is a cross-sectional view schematically illustrating an image sensor module according to one embodiment of the present invention.

FIG. 2 is a cross-sectional view schematically illustrating an image sensor module according to one embodiment of the present invention.

As shown in FIG. 2, an image sensor chip 102, for example, a CMOS Image Sensor (CIS) chip is mounted on and electrically connected with a substrate 100 by a bonding wire 104. A DSP chip 106 can be fixed on the other surfaces of the substrate 100 to face with the image sensor chip 102, as shown in the embodiment of FIG. 2. The DSP chip 106 is attached and connected to the substrate 100 by the bonding wire 104. After that, a mold 108 is formed. A housing 110 having an opening 112 to expose an upper surface of the image sensor chip 102 is attached onto the substrate 100. A lens holder 114 is connected to the housing 110. The lens holder 114 extends the opening 112 vertical upwardly. The lens holder 114 has a fixing jaw 116 disposed on an inner sidewall thereof and having an upper surface substantially parallel with the upper surface of the image sensor chip 102. At this time, a lens unit 120 is assembled at the upper side of the fixing jaw 116 within the lens holder 114.

The housing 110 and the lens holder 114 can be integrally connected with each other, and can be also connected with each other using a predetermined connection unit (not shown) disposed at each of ends thereof. The housing 110 and the lens holder 114 may be formed of insulating material, for example, polycarbonate and polyphenylsulfide.

However, since the embodiment of the present invention does not have a lens assembly unit (26 of FIG. 1) connected to the lens holder 114, impurity particles are not generated. Further, since the lens assembly unit (26 of FIG. 1) is not provided, the lens holder 114 has a smaller diameter or width (W2). Accordingly, the embodiment of the present invention can be effectively applied if the sizes of the substrate 100 and several chips mounted thereon are reduced. Accordingly, embodiments of the present invention are advantageous when the image sensor module is miniaturized.

Figure 3A:
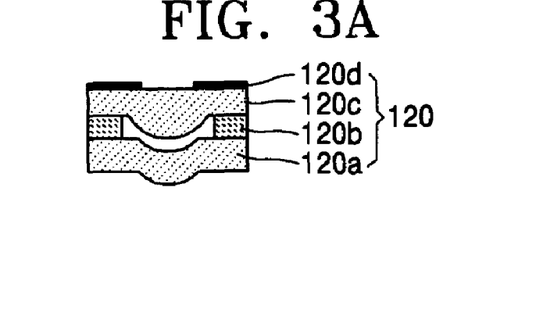
FIGS. 3A and 3B are cross-sectional views illustrating a lens unit according to one embodiment of the present invention.
Figure 3B:
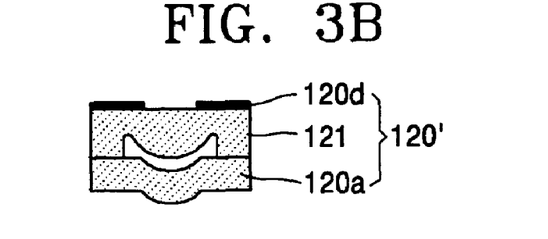

FIGS. 3A and 3B are cross-sectional views illustrating a lens unit according to one embodiment of the present invention.

Referring to FIG. 3A, a ring-shaped spacer 120b is provided on a first spherical or aspherical lens 120a to be closely attached to an inner sidewall of the lens holder 114. A second lens 120c is disposed on the spacer 120b, and a ring shaped screen film 120d can be disposed on the second lens 120c to screen light incident from outside.

The spacer 120b has a thickness of about to about, and has an upper surface substantially parallel with the upper surface of the image sensor chip 102. The thickness of the spacer 120b can be controlled adaptively to the focal length of the lenses 120a and 120b. Because the focal length generally depends on a slope at a center of the lens as well as a distance between lenses, the thickness of the lens 120b can be different depending on a state of the lens.

The width of the spacer 120b may be less than or equal to the widths of flat portions of the lenses 120a and 120c. This is to prevent the spacer 120b from being sloped by the lenses 120a and 120c. If the lenses 120a and 120c are sloped, the centers of the lenses 120a and 120c can be sloped. Accordingly, the focal length of the lens becomes irregular.

According to an embodiment of the present invention, since the distance between the lenses is automatically controlled by the thickness of the spacer 120b, a separate process for manually controlling the focal length is not required.

FIG. 3B illustrates an integral spacer 121, which is a combination of the second lens 120c and the spacer 120b. The lens unit 120 having the integral spacer 121 has the same function as the lens unit 120 having the spacer 120b of FIG. 3A.

Figure 4A:
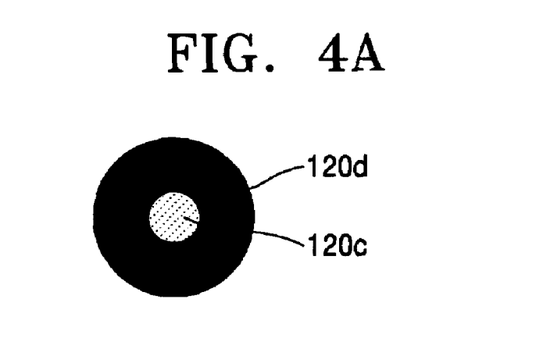
FIGS. 4A and 4B are plan views illustrating a procedure of fabricating a lens unit of FIG. 3A according to one embodiment of the present invention.

FIG. 4A is a plan view of the lens unit 120 of FIG. 3A.

Figure 4B:
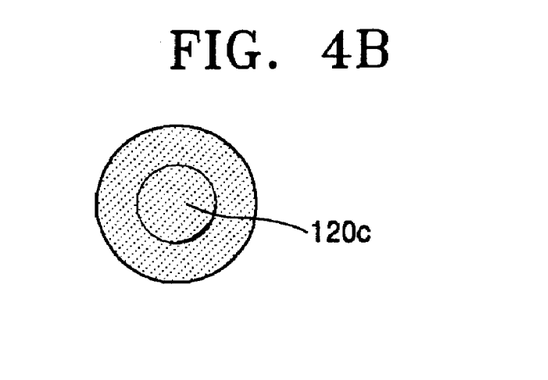

FIG. 4B is a plan view of the internal spacer 121 of FIG. 3B.

A screen film 120d controls an amount of light incident on the image sensor chip 102, and prevents light loss such as scattering from being generated due to light transmission of a screened portion. The screen film 120d can be formed of opaque material, for example, ink, carbon black, and metal. This material is called a light screen material. The light screen material can be coated or adhered on or to the second lens to form the screen film 120d. The width of the screen film 120d may be greater than or equal to the width of a lower flat portion of the second lens 120c. This is to prevent unnecessary light loss from being generated at the flat portion.

Figure 4C:
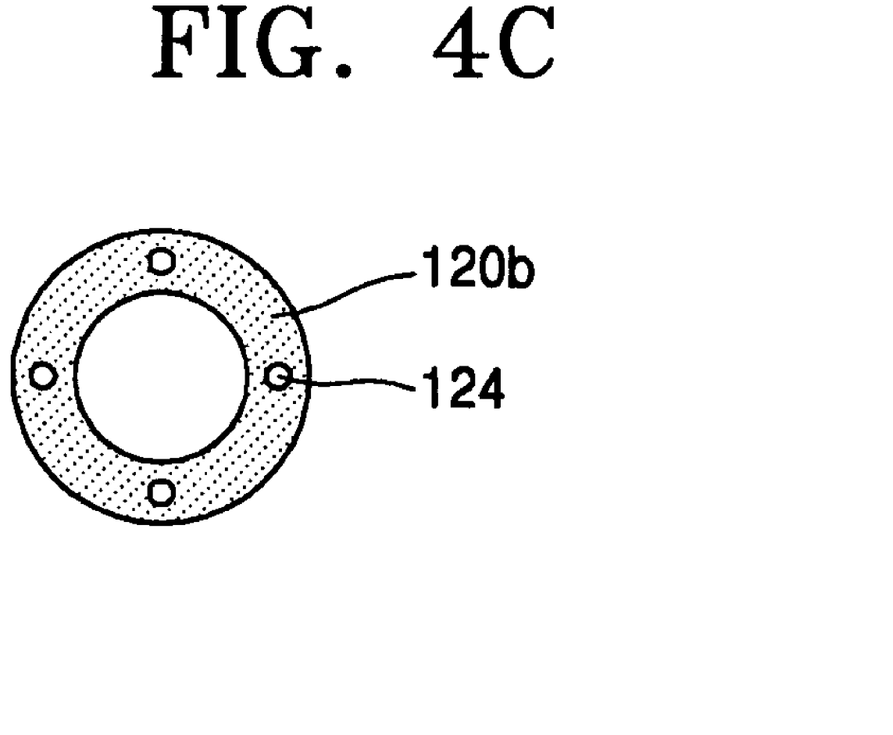
FIGS. 4C and 4D are plan views illustrating a procedure of fabricating the lens unit of FIG. 3A according to one embodiment of the present invention.
Figure 4D:
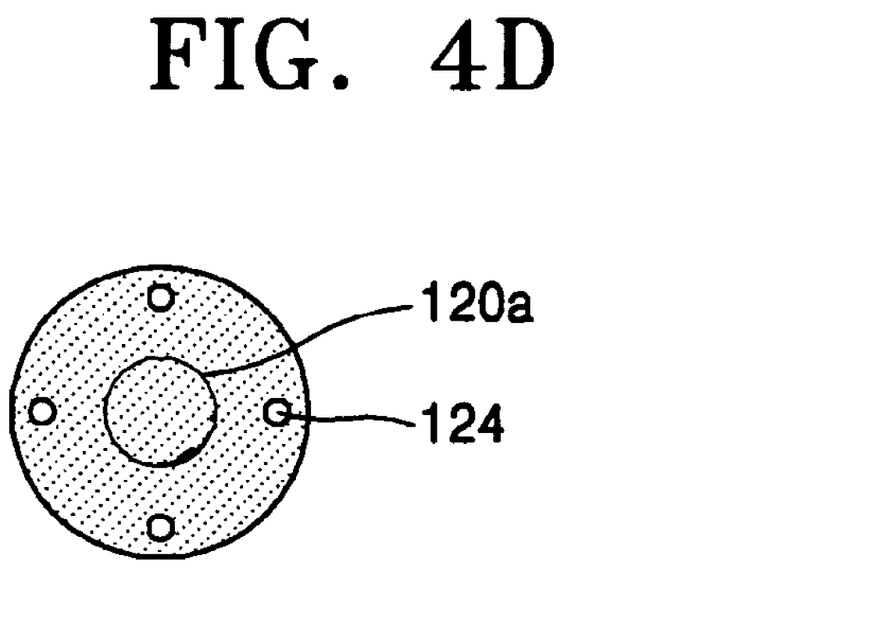

FIGS. 4C and 4D are plan views illustrating a procedure of fabricating the lens unit of FIG. 3A according to one embodiment of the present invention.

Referring to FIGS. 4C and 4D, a binder resin 124 is coated on the first lens 120a. In detail, a droplet of the binder resin 124 is dropped at a predetermined region of an upper surface of the first lens 120a by using a fiber having a small diameter. After that, the spacer 120b is placed and pressed on the coated first lens 120a. If the spacer 120b is pressed, the droplet of the binder resin 124 is spread on the upper surface of the first lens 120a to have a film shape.

Next, the droplet of the binder resin 124 is provided on the upper surface of the spacer 120b in the same manner as aforementioned, and then pressed using the second lens 120c. The ring-shaped screen film 120d can be additionally formed on the second lens 120c to screen light incident from outside.

The binder resin can be an ultraviolet-radiation curing material, for example, an epoxy resin. At this time, the binder resin 124 is cured using ultraviolet between the first resin 120a and the spacer 120b and the second lens 120c, and then the lens unit 120 is heated.

The lens unit 120 can be formed using a suitable jig for precise engagement with the lens holder 114.

A method of fabricating the image sensor module according to one embodiment of the present invention is now described.

First, the image sensor chip 102 is mounted on the substrate 100. After that, the housing 110 and the lens holder 114 are attached to the substrate 100. The housing 110 has the opening 112 to expose the image sensor chip 102, and the lens holder 114 has the fixing jaw 116 disposed on the inner sidewall thereof. The fixing jaw 116 may have the upper surface substantially parallel with the upper surface of the image sensor chip 102. The lens unit 120 installed in the lens holder 114 is fabricated as shown in FIGS. 4A through 4D. And then, the lens unit 120 is assembled on the fixing jaw within the lens holder 114.

Figure 5:
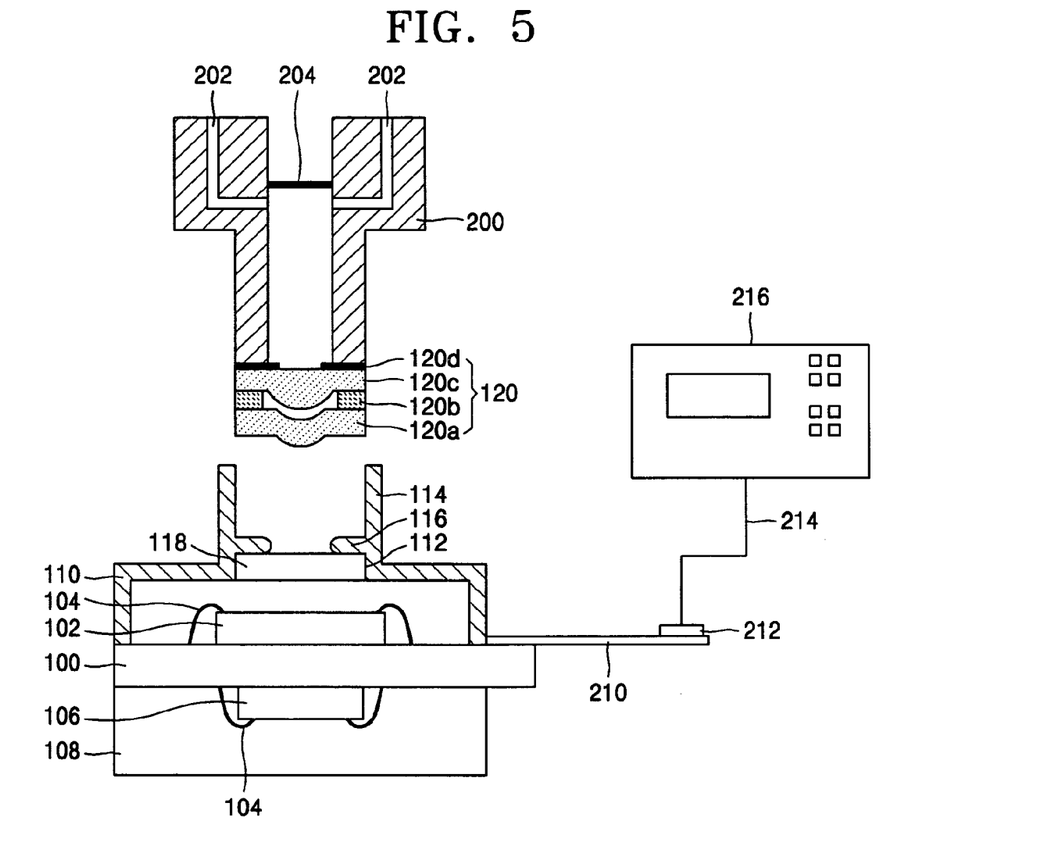
FIG. 5 is a schematic view illustrating a procedure of installing a lens unit in a lens holder according to one embodiment of the present invention.
Figure 6:
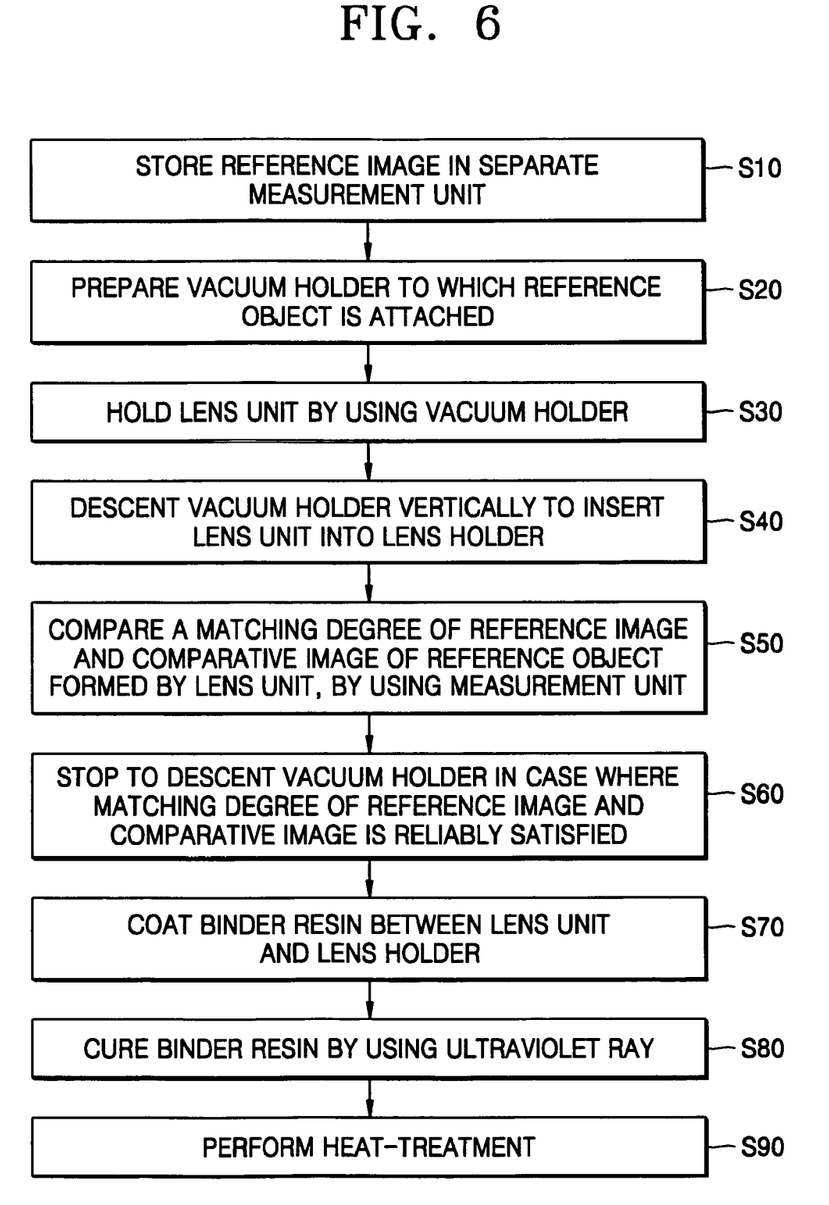
FIG. 6 is a flowchart illustrating a procedure of FIG. 5.

FIG. 5 is a schematic view illustrating a procedure of installing the lens unit 120 in the lens holder 114 according to one embodiment of the present invention. FIG. 6 is a flowchart of the process illustrated in FIG. 5.

Referring to FIGS. 5 and 6, a reference image is stored in a separate measurement unit 216 (S10). Here, the reference image refers to an optimal image provided by a reference object 204, for example, a patterned substrate. After that, a vacuum holder 200 having the reference object 204 is prepared (S20). The lens unit 120 is held using the vacuum from the vacuum holder 200 (S30). The vacuum is provided through a vacuum passage 202. Next, the vacuum holder 200 is vertically descended so that the lens unit 120 is inserted into the lens holder 114 (S40). The term "vertically descended" may mean that the vacuum holder 200 approach the lens holder 114 along any axial direction to the opening of the lens holder 114, vertically or otherwise.

At this time, a comparative image of the reference object 204 is formed in the lens unit 120 to be digitalized in the image sensor chip 102 and the DSP chip 106. The digitalized image is transmitted to the measurement unit 216 along a connection terminal 212 and a signal line 214 via a substrate, for example, a soft printed circuit board 210 connected with the substrate 100.

Next, the measurement unit 216 compares the comparative image of the reference object 204 with the stored reference image (S50). The comparing of the images is to determine whether or not the images are matched with each other to some degree. At a high matching degree, the comparative image and the reference image are well matched. At this time, if the compared images have a reliable matching degree, the vacuum holder 200 stops the descent (S60). After that, the ultraviolet curing binder resin, for example, the epoxy resin is coated between the lens unit 120 and the lens holder 114 (S70). After the binder resin is cured using the ultraviolet ray (S80), a predetermined heat-treatment is performed (S90).

Figure 7:
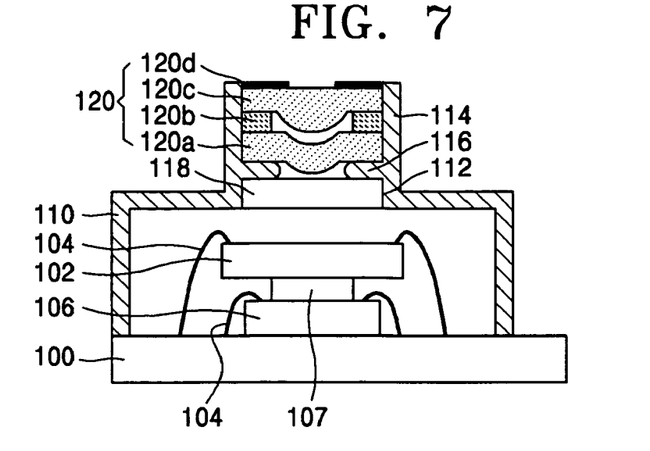
FIGS. 7 through 9 are cross-sectional views illustrating an image sensor module according to another embodiment of the present invention.
Figure 8:
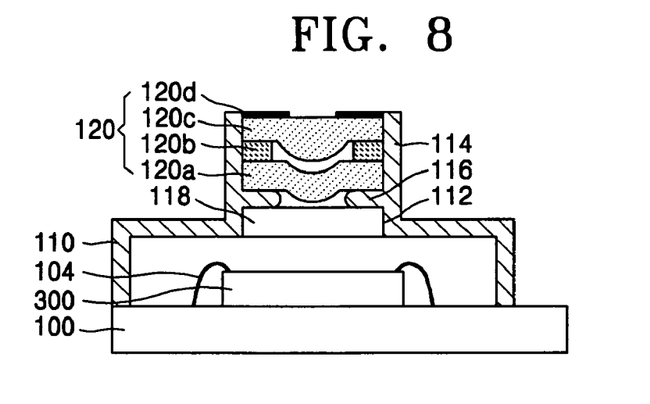
Figure 9:
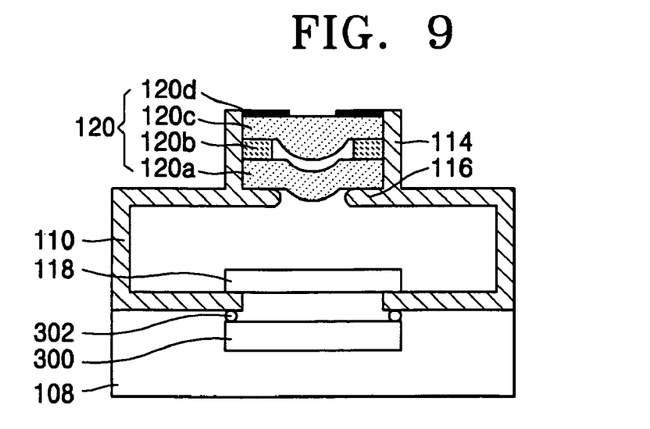

FIGS. 7 through 9 are cross-sectional views illustrating the image sensor module according to other embodiments of the present invention. These embodiments are substantially the same as the above-mentioned embodiment in a procedure of fabricating and assembling the lens unit 120 in the lens holder 114. However, the embodiments are different from each other in a method of mounting the image sensor chip and the DSP chip on the substrate 100.

Referring to FIG. 7, after the DSP chip 106 is attached on the substrate 100, the image sensor chip 102 is connected on the DSP chip 106 by using an inter-chip binder 107 such as epoxy. The image sensor chip 102 and the DSP chip 106 are respectively electrically connected to the substrate 100 by the wire 104.

Referring to FIG. 8, a multi chip 300, which is a combination of the image sensor chip 102 and the DSP chip 106, is attached onto the substrate 100, and is connected by the wire 104.

Referring to FIG. 9, a multi chip 300 is disposed over an opening provided at a central lower side of the substrate 100 to perform the same function as that of FIG. 8. That is, a bump 302 is disposed on a lower surface of the substrate 100 to electrically connect the multi chip 300 with the substrate 100. Next, an infrared-ray screen filter 118 is disposed to cover the opening of the substrate 100.

In the automatically optically aligned image sensor module and the method of fabricating the same according to embodiments of the present invention, when the lens assembly unit is connected, the impurity particles are not generated.

Further, the diameter or the width of the lens holder is small-sized to reduce the sizes of the substrate and several chips mounted thereon. Therefore, the present invention can also contribute to the miniaturization of the image sensor module.

Furthermore, since the distance between the lenses is controlled by the thickness of the spacer, a separate additional process for automatically controlling the focal length is not required.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image sensor module, comprising:
a substrate for mounting an image sensor chip thereon;
a housing which has an opening to expose an upper surface of the image sensor chip, the housing attached to the substrate;
a lens holder, which extends the opening vertically and upwardly; and
a lens unit comprising a plurality of lenses, the lens unit having a spacer disposed therebetween, the spacers being directly attached to at least one of the plurality of lenses, the lens unit affixed to an inner sidewall of the lens holder.

2. The image sensor module of claim 1, wherein the spacer is a ring-shaped spacer disposed between the lenses and near the inner sidewall of the lens holder to control a distance between the plurality of lenses and automatic alignment of the plurality of lenses.

3. The image sensor module of claim 2, wherein the plurality of lenses and the spacer are an integral-type.

4. The image sensor module of claim 2, wherein the distance is controlled by a variation of a thickness of the spacer.

5. The image sensor module of claim 2, wherein the spacer has a width less than or equal to a flat portion of any of the plurality of lenses.

6. The image sensor module of claim 1, further comprising a screen film on an uppermost lens of the lens unit.

7. The image sensor module of claim 1, wherein the lens holder has a fixing jaw extending into a portion of the extended opening.

8. The image sensor module of claim 7, wherein the fixing jaw has an upper surface substantially parallel with an upper surface of the image sensor chip, on a lower inner sidewall of the lens holder.

9. The image sensor module of claim 1, further comprising a digital image processor chip disposed on a lower surface of the substrate.

10. The image sensor module of claim 1, further comprising a digital image processor chip between the substrate and the image sensor chip.

11. The image sensor module of claim 1, wherein the plurality of lenses comprise a plurality of spherical or aspheric lenses.

12. The image sensor module of claim 7, further comprising an infrared-ray screen filter disposed between the fixing jaw and the substrate.

13. The image sensor module of claim 1, wherein the spacer is disposed between and attached to two of the plurality of lenses.

14. A method of fabricating an image sensor module, the method comprising:
mounting an image sensor chip on a substrate;
attaching a housing and a lens holder onto the substrate, the housing having an opening which exposes the image sensor chip, the lens holder extending the opening vertically and upwardly;
providing a lens unit into the lens holder, the lens unit comprising a plurality of lenses, having a spacer disposed therebetween, the spacer being directly attached to at least one of the plurality of lenses; and
assembling the lens unit to an inner sidewall of the lens holder.

15. The method of claim 14, wherein the lens holder has a fixing jaw extending into a portion of the extended opening such that the lens unit is automatically aligned by the fixing jaw.

16. The method of claim 15, wherein the fixing jaw has an upper surface substantially parallel with an upper surface of the image sensor chip and is further provided on a lower inner sidewall of the lens holder.

17. A method of fabricating an image sensor module, the method comprising:
mounting an image sensor chip on a substrate;
attaching a housing and a lens holder onto the substrate, the housing having an opening which exposes the image sensor chip, the lens holder extending the opening vertically and upwardly;
providing a lens unit into the lens holder, the lens unit comprising a plurality of lenses, having a spacer disposed therebetween; and
assembling the lens unit to an inner sidewall of the lens holder;
wherein providing the lens unit comprises:
coating a binder resin on an upper surface of a first lens;
pressing the spacer onto the first lens having the coated binder resin;
coating the binder resin on an upper surface of the pressed spacer; and
pressing a second lens onto the spacer having the coated binder resin.

18. The method of claim 17, wherein the coating the binder resin comprises:
placing a droplet of the binder resin at a predetermined area of an upper surface of the first lens or the spacer by using a fiber; and
spreading the placed droplet in a film type by pressing the spacer or the second lens.

19. The method of claim 17, wherein the binder resin is formed of an ultraviolet-radiation curing material.

20. The method of claim 17, further comprising, after the pressing the second lens:

curing the binder resin by using ultraviolet radiation; and heating the cured results.

21. An automatic focus controlling method using an auto-aligned lens, the method comprising:

preparing a reference object;

storing a reference image, which is provided as an optimal image of the reference object, in a separate measurement unit;

preparing a vacuum holder to which the reference object is attached;

holding a lens unit by the vacuum holder;

driving the vacuum holder towards a lens holder to insert the lens unit into the lens holder;

comparing a matching degree of the reference image and a comparative image, which is an image of the reference object formed by the lens unit, by using the measurement unit;

stopping the driving when the matching degree of the reference image and the comparative image is reliably satisfied; and fixing the lens unit to the lens holder by using a binder resin.

22. The method of claim 21, wherein the fixing further comprises:

curing the binder resin by using ultraviolet radiation; and heating the cured binding resin to heat-treat.

* * * * *

UNITED STATES PATENT AND TRADEMARK OFFICE
CERTIFICATE OF CORRECTION

| | | |
|---|---|---|
| PATENT NO. | : 7,379,113 B2 | Page 1 of 1 |
| APPLICATION NO. | : 11/112819 | |
| DATED | : May 27, 2008 | |
| INVENTOR(S) | : Yung-Cheol Kong et al. | |

It is certified that error appears in the above-identified patent and that said Letters Patent is hereby corrected as shown below:

Column 5, line 5, the words "120b has a thickness of about to about, and has" should read -- 120b has --.

Signed and Sealed this

Second Day of September, 2008

JON W. DUDAS
*Director of the United States Patent and Trademark Office*